(12) United States Patent
Morrison

(10) Patent No.: US 6,359,580 B1
(45) Date of Patent: Mar. 19, 2002

(54) MULTIPLE SOURCE KEYPAD CHANNEL ENTRY SYSTEM AND METHOD

(75) Inventor: Hugh Boyd Morrison, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 08/824,887

(22) Filed: Mar. 18, 1997

(51) Int. Cl.$^7$ ............................................. H04N 5/50
(52) U.S. Cl. ........................................ 341/731; 348/731
(58) Field of Search ........................... 345/327; 455/3.2, 455/4.2; 348/6, 10, 554, 553, 563, 569, 570, 725, 731, 734, 906, 13; 725/56–59, 48; H04N 5/445

(56) References Cited

U.S. PATENT DOCUMENTS

| | | | | |
|---|---|---|---|---|
| 4,223,352 A | * | 9/1980 | Belisomi | 348/732 |
| 4,996,597 A | * | 2/1991 | Duffield | 348/705 |
| 5,068,734 A | * | 11/1991 | Beery | 348/570 |
| 5,103,314 A | * | 4/1992 | Kennan | 348/732 |
| 5,182,646 A | * | 1/1993 | Kennan | 348/732 |
| 5,237,420 A | * | 8/1993 | Hayashi | 348/570 |
| 5,297,204 A | * | 3/1994 | Levine | 380/10 |
| 5,353,121 A | | 10/1994 | Young et al. | 348/563 |
| 5,434,626 A | * | 7/1995 | Hayashi et al. | 348/569 |
| 5,436,675 A | * | 7/1995 | Hayashi et al. | 348/725 |
| 5,479,266 A | | 12/1995 | Young et al. | 386/83 |
| 5,479,268 A | | 12/1995 | Young et al. | 386/83 |
| 5,539,822 A | | 7/1996 | Lett | 380/20 |
| 5,557,337 A | * | 9/1996 | Scarpa | 348/558 |
| 5,585,838 A | * | 12/1996 | Lawler et al. | 348/13 |
| 5,592,551 A | | 1/1997 | Lett et al. | 380/20 |
| 5,659,367 A | * | 8/1997 | Yuen | 348/465 |
| 5,684,528 A | * | 11/1997 | Okutsu et al. | 348/15 |
| 5,734,589 A | * | 3/1998 | Kostreski et al. | 345/327 |
| 5,790,202 A | * | 8/1998 | Kummer et al. | 348/553 |
| 5,801,787 A | * | 9/1998 | Schein et al. | 348/569 |
| 5,808,694 A | * | 9/1998 | Usui et al. | 348/569 |
| 5,828,945 A | * | 10/1998 | Klosterman | 455/42 |
| 5,841,433 A | * | 11/1998 | Chaney | 345/327 |
| 5,850,218 A | * | 12/1998 | LaJoie et al. | 345/327 |
| 5,867,207 A | * | 2/1999 | Chaney et al. | 348/7 |
| 5,883,677 A | * | 3/1999 | Hofmann | 348/584 |
| 5,926,207 A | * | 7/1999 | Vaughan et al. | 348/552 |
| 6,252,634 B1 | * | 6/2001 | Yuen et al. | 348/731 |

FOREIGN PATENT DOCUMENTS

| | | | | |
|---|---|---|---|---|
| DE | 3145407 A1 | 5/1983 | | H04N/5/50 |
| EP | 056189 A2 | 9/1993 | | H04N/5/445 |
| JP | 4-336780 | * | 11/1992 | |
| WO | WO93/12611 | 6/1993 | | H04N/5/445 |
| WO | 98/42128 | * | 9/1998 | |

* cited by examiner

*Primary Examiner*—Michael Lee
*Assistant Examiner*—Linus H. Lo
(74) *Attorney, Agent, or Firm*—Joseph S. Tripoli; Frank Y. Liao

(57) ABSTRACT

A system and method allows a television viewer to select a channel without having to pre-select the source of the television signal received. If a conflict occurs in that multiple sources such as a satellite system, high definition television (HDTV), or cable TV all utilize the desired channel, then the system informs the viewer on the television display of the conflict and prompts the viewer for the desired source for the selected channel.

9 Claims, 3 Drawing Sheets

MULTIPLE SOURCE KEYPAD CHANNEL ENTRY SYSTEM AND METHOD

FIELD OF THE INVENTION

This invention relates to electronic program guide data for television systems in general and, in particular, to the discrimination of multiple television signal sources having like designators.

BACKGROUND

An Electronic Program Guide (EPG) is an interactive, on-screen analog to TV listings found in local newspapers or other print media. An EPG provides information about each program within the time frames covered by the EPG which typically ranges from the next hour up to seven days. The information contained in an EPG includes programming characteristics such as channel number, program title, start time, end time, elapsed time, time remaining, rating (if available), topic, theme, and a brief description of the program's content. EPGs are usually arranged in a two-dimensional table or grid format with time on one axis and channel numbers on the other axis. Unlike non-interactive guides that reside on a dedicated channel and merely scroll through the current programming on the other channels for the next 2 to 3 hours, EPGs allow viewers to select any channel at any time up to seven days forward. Further EPG features include the ability to highlight individual cells of the grid containing program information. Once highlighted the viewer can perform functions pertaining to that selected program. For instance, the viewer could instantly switch to that program if it is currently being aired. Viewers could also program one touch video cassette recording (VCR) or the like if the television is properly configured and connected to a recording device.

Such EPGs are known in the art and described, for instance, in U.S. Pat. Nos. 5,353,121; 5,479,268; and 5,479,266 issued to Young et al. and assigned to StarSight Telecast, Inc. These patents are all directed to television scheduling systems or EPGs in which a television display can be brought up by a viewer showing the current channel offerings in a table format. The cells of the table which form the columns and rows are irregular in length (row dimension) because not every program spans the same amount of time while the columns are regular in height. Typically, programs are broken down into ½ hour increments and a single program can last in excess of two hours. This is illustrated in FIG. 1 of U.S. Pat. No. 5,353,121 in which "Perfect Strangers" spans from 11:00 AM to 11:30 AM while in the row below "Sesame Street" spans the length of the grid covering in excess of 1½ hours.

Digital television viewers now have the ability to view more channels than ever before in more ways than ever before. A problem has arisen, however, due to the increasing number of sources transmitting television signals including Digital Satellite Systems (DSS), high definition television (HDTV), and digital cable. DSS allows for numerical channel designators to range from 100 to 999 while HDTV viewers can choose channels from 0 to 999, and cable channels range from 1 to 125. Obviously, these ranges overlap causing confusion for viewers. For instance, how are viewers to know which source they are receiving if the channel number is 105. Channel 105 can be from any one of the three sources identified above.

The current state of the art requires viewers to manually enter the desired television signal source prior to scrolling through the available channels. What is needed is a system that can discriminate among television signal sources without requiring the viewer to pre-select a source.

SUMMARY OF THE INVENTION

The present invention allows viewers to select a channel and, if there is no conflict of television signal sources for the selected channel, then the system will automatically tune to the only available source for the selected channel. However, if the system detects a conflict, i.e. multiple sources for the selected channel, a message will appear on-screen showing the viewer the list of available sources and allowing the user to select from the list. The system is designed to allow viewers to disable the feature or set a default source if desired. By allowing the user to select a channel prior to the source the system releases the viewer from having to select a source in all cases since the system will only prompt the viewer for a source if there is a conflict.

BRIEF DESCRIPTION OF THE DRAWING

The foregoing and further features of the invention are illustrated in the accompanying drawings in which.

DETAILED DESCRIPTION

The proliferation of sources transmitting television signals has led to a situation where channel designators, e.g., numbers or labels such as "NBC", can apply to multiple sources. Further, viewers can change channels in a variety of ways including "channel up"/"channel down" buttons (e.g., on a remote control), selecting from an electronic program guide (EPG), direct digit entry, or using voice recognition techniques to recognize a user's spoken selection of a particular channel. This can confuse viewers when the sources are integrated into a single scan list in which channel 105, for instance, may have multiple program entries.

Figure 1:
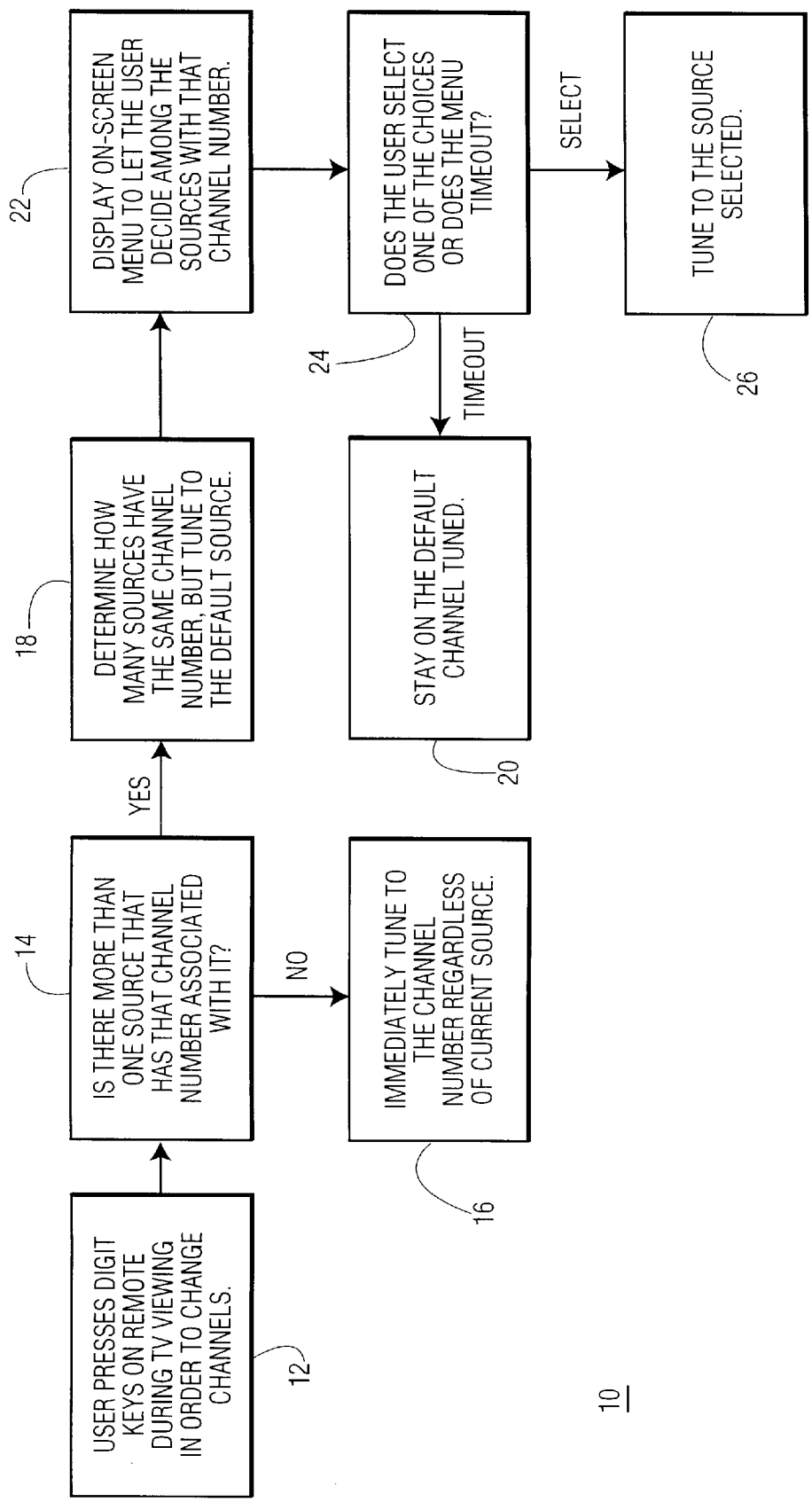
FIG. 1 is a flow diagram of the major block components of the system.
Figure 2:
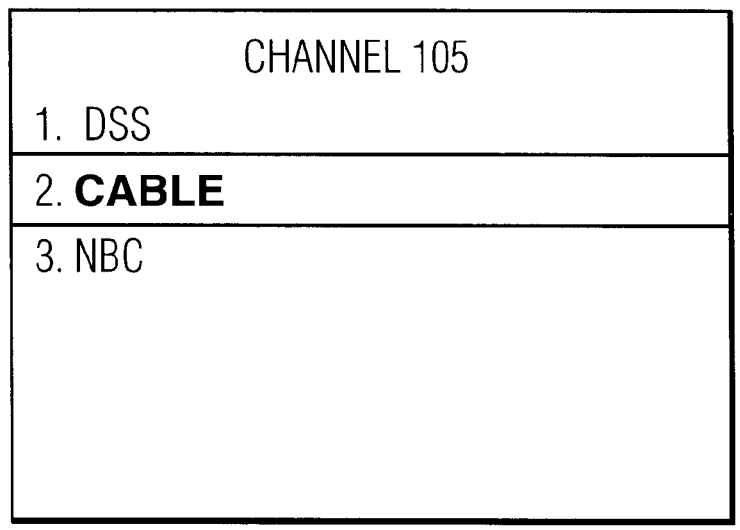
FIG. 2 is an example of a screen display listing the available sources for a given channel in which the "cable" source is highlighted.

FIG. 1 details the process by which the system is implemented. With the television on, the viewer selects 12 a channel. Selecting a channel as used herein encompasses various approaches to channel selection including selection of a channel number or channel label by pressing buttons, e.g., on a remote control, and voice recognition techniques wherein a user's verbal command to select a certain channel is received and processed to tune the desired channel. The system then internally processes the selected channel to determine whether there is more than one source for that entry. If not, the system immediately tunes the television to the desired channel regardless of the current source. If a conflict is detected, however, the system determines 18 how many sources share the selected channel and initially tunes 18 to the default source. A display message 22 similar to that shown in FIG. 2 is shown allowing the viewer the ability to choose among the displayed sources. The system then waits 24 for viewer response. If no response is detected within a timeout period the system will remain 20 on the default source and clear the message from the screen. If the viewer responds by changing and selecting a new source then the system will tune 26 the television to the desired source and clear the message from the screen.

FIG. 2 illustrates a sample display message shown to the viewer when the system detects a conflict. The viewer merely toggles to the desired source for the channel selected. FIG. 2 shows the "Cable" option initially highlighted. Optionally, the viewer could have set up the system to always highlight cable first or one of the other sources as a default rather than the currently operating source. System defaults can also be factory set.

Figure 3:
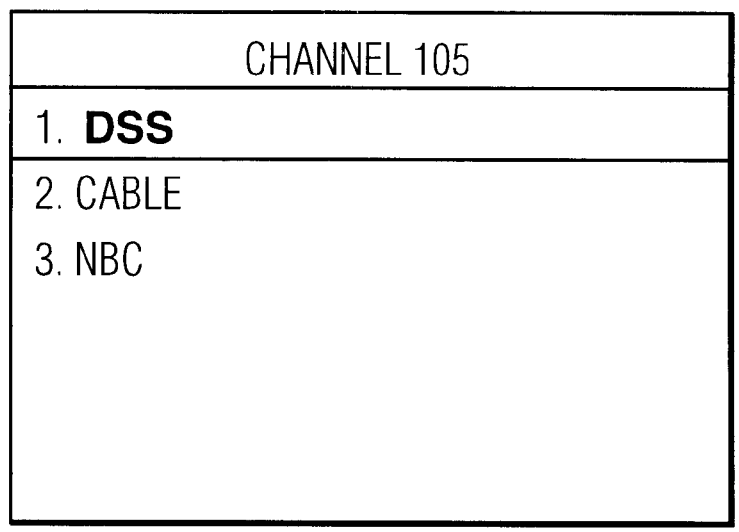
FIG. 3 is an example of a screen display listing the available sources for a given channel in which the "DSS" source is highlighted.

Once the multiple source message is displayed 22 the viewer is given a finite time period to respond. If the viewer does not respond the display will timeout and the system will tune to the default source. Otherwise, the viewer will select a source using any of the navigation keys or numerical keys on the remote device. For example, the viewer may wish to switch to DSS. To do so the viewer merely press the "1" key or the "up arrow" followed by the select key to effect the change. Once the "1" or "up arrow key is selected the display will change to that shown in FIG. 3. Another application of the system occurs when the source is high definition television (HDTV). HDTV programs occupy multiple channels using the increased bandwidth to display a higher quality picture. Suppose a movie is showing on source X at channel 37 in HDTV mode from 8:00–10:00 PM. Following the movie that source returns to standard definition television (SDTV) on which four channels are now available. When viewers now tune to channel 37 they have four options from which to choose, i.e. 37a, 37b, 37c, and 37d. Each of the four channels is showing a different SDTV program. The current system can be employed in a similar manner to display the four choices and prompt the viewer to select one.

Figure 4:
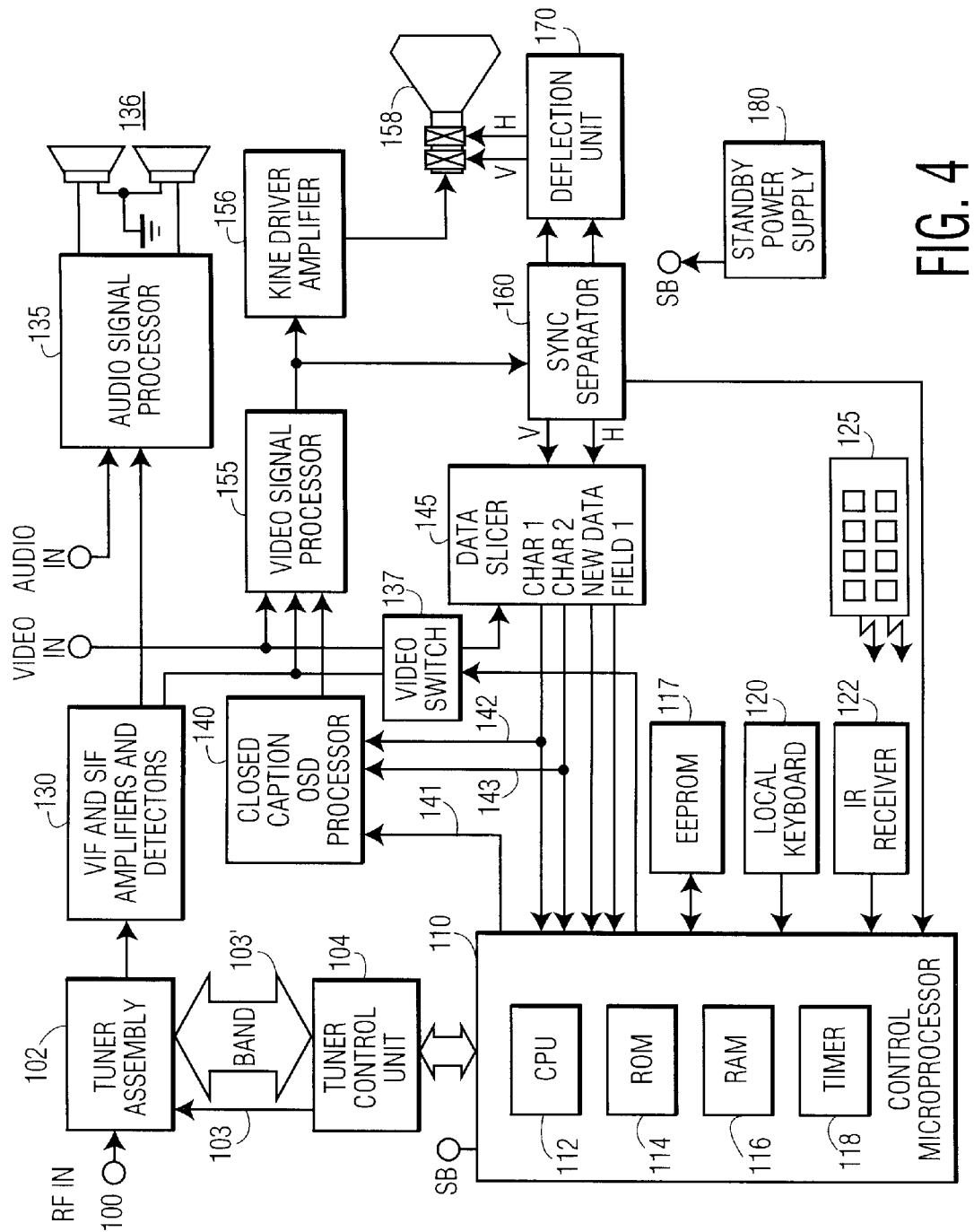
FIG. 4 illustrates a television receiver suitable for use with the invention.

FIG. 4 illustrates a television receiver capable of implementing the invention as described above. Referring to FIG. 4, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal lines represented by the broad double-ended arrow 103, to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The detected audio signal is applied to an audio processor 135 for processing and amplification before being applied to a speaker assembly 136.

Tuner controller 104 generates the tuning voltage and bandswitching signals in response to control signals applied from a system control microcomputer (μC) 110. The terms "microcomputer", "controller", and "microprocessor", as used herein, are equivalent. It is also recognized that the control function of microcomputer 110 may be performed by an integrated circuit especially manufactured for that specific purpose (i.e., a "custom chip"), and the term "controller" as used herein, is also intended to include such a device.

Microcomputer 110 receives user-initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel-related data in a random access memory (RAM) 116. RAM 116 may be either internal to, or external to, microprocessor 110, and may be either the volatile or non-volatile type. The term "RAM" is also intended to include electrically erasable programmable read only memory (EEPROM) 117. One skilled in the art will recognize that if volatile memory is utilized, that it may be desirable to use a suitable form of standby power (such as from STANDBY POWER SUPPLY 180) to preserve its contents when the receiver is turned off.

Microcomputer 110 also includes a timer 118 for providing timing signals as needed. Microcomputer (or controller) 110 generates a control signal for causing tuner control unit 104 to control tuner 102 to select a particular RF signal, in response to user-entered control signals from local keyboard 120 and from infrared (IR) receiver 122. IR receiver 122 is powered from Standby Power Supply 180 to be able to receive a command to turn on the receiver.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processing unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source.

The first and second baseband video signals (TV) are coupled to a video processor unit 155 (having a selection circuit not shown). Electrically erasable programmable read only memory (EEPROM) 117 is coupled to controller 110, and serves as a non-volatile storage element for storing autoprogramming channel data, and user-entered channel data.

The processed video signal at the output of video signal processor unit 155, is applied to a Kine Driver Amplifier 156 for amplification and then applied to the guns of a color picture tube assembly 158 for controlling the deflection of its electron beam.

The television receiver may also include closed caption circuitry as follows. A Data Slicer 145 receives closed caption data at a first input from VIF/SIF amplifier and detector unit 130, and at a second input from the VIDEO IN terminal via a Video Switch 137 which selects the proper source of closed caption data under control of controller 110. Data Slicer 145 supplies closed caption data to Closed Caption OSD Processor 140 via lines 142 and 143. Data Slicer 145 supplies closed caption status data (Newdata, Field1) to controller 110. Under control of controller 110, via control line 141, Closed Caption OSD Processor 140 generates character signals, and applies them to an input of video signal processor 155, for inclusion in the processed video signal. Alternatively, Closed Caption OSD Processor 140 and Data Slicer 145 may be included in controller 110.

Electrically-erasable programmable read only memory (EEPROM) 117 is coupled to microcomputer 110, and serves as a non-volatile storage element for storing autoprogramming channel data, and user-entered channel data.

Microcomputer 110, as applied to the present invention, has several functions. The microcomputer 110 is coupled to a channel selection device, e.g., remote control device 125 and receives a channel number from same. Next, microcomputer 110 processes the channel number to determine the number of television signal sources which utilize the entered channel number. A list of the sources is displayed if there is more than one and the microcomputer 110 prompts the viewer to select from the displayed list of sources and tunes the television to the channel and source selected by the viewer.

While the invention has been described with reference to the preferred embodiment thereof, it will be appreciated by those of ordinary skill in the art that various modifications can be made to the structure and function of individual parts of the system without departing from the spirit and scope of the invention as a whole.

What is claimed is:

1. A method for selecting from a choice of multiple signal sources transmitting programs utilizing same channel designator, comprising the steps of:
   selecting a channel designator;
   determining how many sources utilize the selected channel designator concurrently,
   displaying a list of the signal sources utilizing the selected channel designator only if the signal sources utilizing the selected channel designator exceed one signal source in the determining step;
   selecting the desired source from the list of signal sources; and
   tuning automatically, to a program corresponding to the channel designator selected for the signal source selected.

2. A method for selecting from a choice of multiple signal sources transmitting programs utilizing same channel designator, comprising the steps of:
   selecting a channel designator;
   determining how many signal sources utilize the selected channel designator; and
   if it is determined that there is only one signal source for the selected channel designator, immediately tuning to a program corresponding to the channel designator selected for the only signal source utilizing the selected channel designator.

3. The method of claim 1 further comprising the steps of:
   setting a timeout period for the viewer to select a signal source once the list of signal sources has been displayed; and
   tuning the television to a default signal source for the selected channel designator if a selection has not been made within the designated timeout period.

4. The method of claim 3 wherein the list of signal sources and channel information is obtained from an Electronic Program Guide (EPG).

5. The method of claim 4 wherein the signal sources include satellite signal source, high definition television (HDTV), and digital cable television.

6. A video system for allowing a viewer to select from a choice of multiple signal sources utilizing a single channel, said system comprising a microcomputer including CPU and memory means containing program data, said microcomputer coupled to means for selecting a channel wherein said microcomputer determining a number of signal sources which utilize the selected channel concurrently and displays a list of said signal sources if there is more than one and prompts the viewer to select from the displayed list of signal sources only if said signal sources utilizing the selected channel designator exceed one signal source and tunes the video system to the selected channel and to the signal source selected by the viewer.

7. The system of claim 6 wherein the microcomputer sets a timeout period for the viewer to select a signal source once the list of signal sources has been displayed and tunes the television to a default signal source for the selected channel if the viewer has not made a selection within the designated timeout period.

8. The system of claim 7 wherein the list of signal sources and channel information is obtained from an Electronic Program Guide (EPG).

9. The system of claim 8 wherein the sources include satellite signal source, high definition television (HDTV), and digital cable television.

* * * * *